(12) United States Patent
Gupta et al.

(10) Patent No.: US 9,274,979 B2
(45) Date of Patent: Mar. 1, 2016

(54) SYSTEM, METHOD, AND COMPUTER PROGRAM PRODUCT FOR OPTIMIZING DATA ENCRYPTION AND DECRYPTION BY IMPLEMENTING ASYMMETRIC AES-CBC CHANNELS

(71) Applicant: NVIDIA Corporation, Santa Clara, CA (US)

(72) Inventors: Karan Gupta, Noida (IN); Brahmanandam Karuturi, Hyderabad (IN); Jay S. Huang, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 48 days.

(21) Appl. No.: 14/092,870

(22) Filed: Nov. 27, 2013

(65) Prior Publication Data

US 2015/0149788 A1 May 28, 2015

(51) Int. Cl.
*G06F 12/14* (2006.01)
*G06F 21/00* (2013.01)
*G06F 21/60* (2013.01)

(52) U.S. Cl.
CPC ............ *G06F 12/1408* (2013.01); *G06F 21/00* (2013.01); *G06F 21/602* (2013.01)

(58) Field of Classification Search
USPC .......................................... 713/189, 192–194
See application file for complete search history.

(56) References Cited

U.S. PATENT DOCUMENTS

| | | | |
|---|---|---|---|
| 2002/0029344 A1* | 3/2002 | Morishita | 713/187 |
| 2010/0138648 A1* | 6/2010 | Nishikawa et al. | 713/151 |
| 2010/0153747 A1* | 6/2010 | Asnaashari et al. | 713/193 |
| 2013/0332744 A1* | 12/2013 | Zhuang | 713/189 |

OTHER PUBLICATIONS

Fazackerley, S., McAvoy, S. M. & Lawrence, R. (2012). GPU accelerated AES-CBC for database applications; SAC '12 Proceedings of the 27th Annual ACM Symposium on Applied Computing (p./pp. 873-878).*

* cited by examiner

*Primary Examiner* — Tae Kim
*Assistant Examiner* — Louis Teng
(74) *Attorney, Agent, or Firm* — Zilka-Kotab, PC

(57) ABSTRACT

A system, method, and computer program product are provided for implementing asymmetric AES-CBC (Advanced Encryption Standard-Cipher Block Chaining) channels usage between encryption and decryption of data. In operation, data to be written to memory is identified. In addition, the data is encrypted utilizing a first AES-CBC channel. Additionally, at least one of a plurality of AES-CBC channels is utilized to decrypt the data to achieve a determined performance target.

11 Claims, 4 Drawing Sheets

SYSTEM, METHOD, AND COMPUTER PROGRAM PRODUCT FOR OPTIMIZING DATA ENCRYPTION AND DECRYPTION BY IMPLEMENTING ASYMMETRIC AES-CBC CHANNELS

FIELD OF THE INVENTION

The present invention relates to data encryption and decryption, and more particularly to optimizing encryption and decryption.

BACKGROUND

Data security in the context of computer system environments and operating systems has become increasingly important with the constant increase in the development of various systems. In the context of data security, many systems implement AES-CBC (Advanced Encryption Standard-Cipher Block Chaining) mode encryption while writing data to memory and AES-CBC decryption while reading the data back from the memory (e.g. embedded memory, external memory, etc.). As memory has become faster, AES-CBC mode encryption/decryption throughput has become a key performance bottleneck. Thus, there is a need for addressing this issue and/or other issues associated with the prior art.

SUMMARY

A system, method, and computer program product are provided for implementing asymmetric AES-CBC (Advanced Encryption Standard-Cipher Block Chaining) channels usage between encryption and decryption of data. In operation, data to be written to memory is identified. In addition, the data is encrypted utilizing a first AES-CBC channel. Additionally, at least one of a plurality of AES-CBC channels is utilized to decrypt the data to achieve a determined performance target.

DETAILED DESCRIPTION

Figure 1:
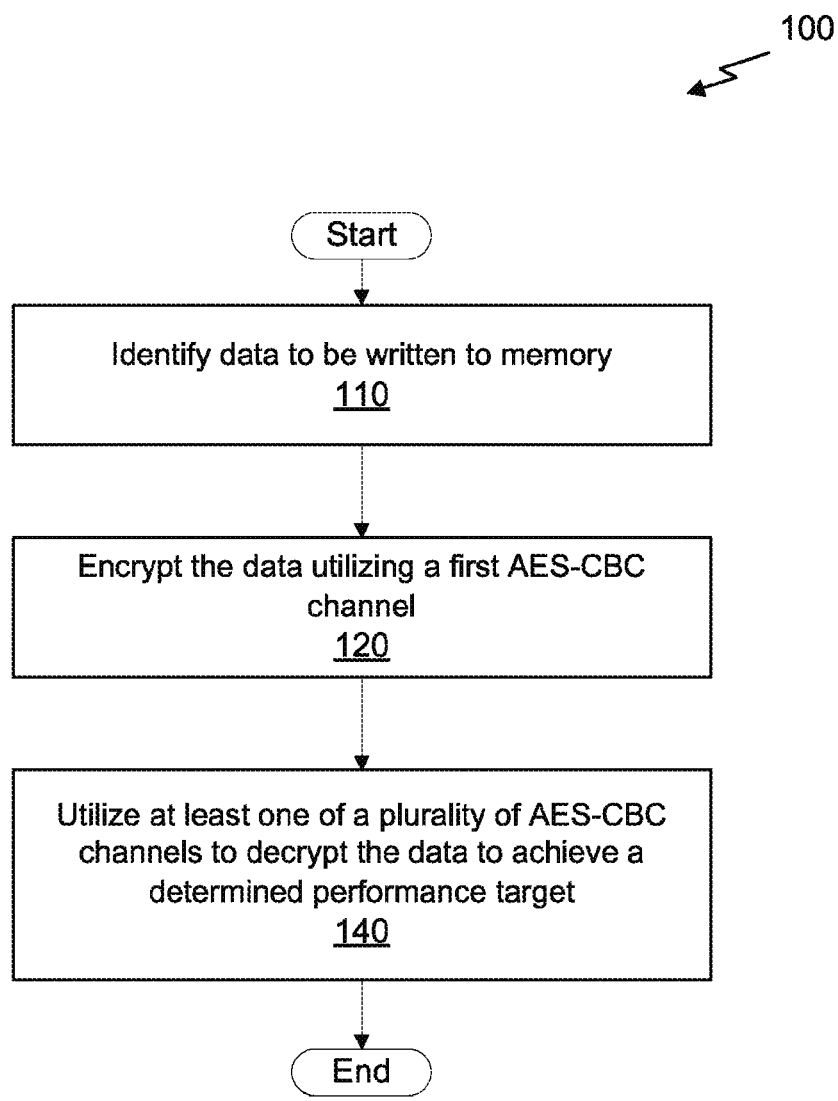
FIG. 1 illustrates a flowchart of a method for utilizing a plurality of AES-CBC channels for encryption and decryption of data, in accordance with one embodiment.

FIG. 1 illustrates a flowchart of a method 100 for utilizing a plurality of AES-CBC channels for encryption and decryption of data, in accordance with one embodiment. As shown in operation 110, data to be written to memory is identified. In operation 120, the data is encrypted utilizing a first AES-CBC channel. Additionally, as shown in operation 130, at least one (or, in one embodiment, at least two, etc.) of a plurality of AES-CBC channels is utilized to decrypt the data to achieve a determined performance target (e.g. as part of a read operation, etc.).

For example, based on the determined performance target, a plurality of AES-CBC channels may be utilized in parallel to decrypt the data to achieve the performance target. On the other hand, the encryption of the data may be accomplished utilizing a single channel for encryption.

In the context of the present description, CBC refers to a mode where each block of plaintext is XORed with a previous ciphertext block before being encrypted. This way, each ciphertext block depends on all plaintext blocks processed up to that point. Further, in the context of the present description, AES mode refers to a mode associated with the Advanced Encryption Standard established by the U.S. National Institute of Standards and Technology (NIST) in 2001.

In operation, the data may be decrypted utilizing the AES channels while reading the data from the memory (e.g. embedded memory, external memory, NAND flash memory, NOR flash memory, etc.). Further, in one embodiment, the method 100 may include determining a number of the plurality of AES-CBC channels to utilize to decrypt the data in parallel.

In one embodiment, the number of the plurality of AES-CBC channels to utilize to decrypt the data in parallel may be determined based on the performance target. For example, it may be determined that three channels for decryption are required to meet the performance target. On the other hand, it may be determined that only two channels (or one channel, etc.) for decryption is required to meet the performance target.

In one embodiment, the method 100 may include determining a performance target (e.g. associated with decryption of the data, etc.). The performance target may be determined based on a variety of criteria. For example, in one embodiment, the performance target may be determined based on an operating system (e.g. a mobile device operating system, a desktop operating system, etc.) and/or application (e.g. a drive encryption application, such as Bitlocker®, etc.) performance target and/or requirement.

In another embodiment, the performance target may be determined based on a computational device operating system performance target. In another embodiment, the performance target may be determined based on hardware associated with a computational device. In yet another embodiment, the performance target may be associated with an available bandwidth of the memory. Further, in one embodiment, the determination of the performance target may be part of the product planning process, such that the number of hardware AES decryption cores needed to meet a maximum performance envelope is known.

The computational device may include any type of device capable of computation. For example, in various embodiments, the computational device may include a desktop computer, a handheld computer, a mobile phone, a tablet computer, a gaming device, and/or any other type of computational device.

In another embodiment, the performance target may be determined based on a speed associated with encrypting the data utilizing the first AES-CBC channel. For example, in one embodiment, the performance target for decryption of the data may include decrypting the data at a speed that is X times the time it takes to encrypt the data, where X is an integer greater than one. In this case, in one embodiment, the number of channels used to decrypt the data may scale directly with X. For example, three channels may be used to meet a performance target of a decryption speed that is three times the speed of the single encryption channel.

Further, in one embodiment, determining the number of the plurality of AES-CBC channels to utilize to decrypt the data in parallel may be dynamic. For example, in one embodiment, determining the number of the plurality of AES-CBC channels to utilize to decrypt the data in parallel may occur at runtime. In another embodiment, determining the number of the plurality of AES-CBC channels to utilize to decrypt the data in parallel may occur prior to runtime.

It should be noted that, while decryption of the data may take advantage of using multiple parallel decryption channels that each include an engine capable of encrypting and/or decrypting the data, the AES channel used for encryption may utilize a single encryption engine (e.g. that is capable of encrypting and/or decrypting the data). Further, the first encryption channel used to encrypt the data may be a subset of the AES channels. In other words, the plurality of AES-CBC channels may include the first AES-CBC channel (e.g. which may also be used for decryption, in one embodiment, etc.).

Depending on the performance target, all of the plurality of AES-CBC channels may be utilized to decrypt the data. On the other hand, the performance target may require that only a portion of the plurality of AES-CBC channels be utilized to decrypt the data.

In one embodiment, the systems and methods described herein may function to implement optimized data encryption and decryption utilizing multiple decryption channels. For example, in one embodiment, the systems may utilize an asymmetric implementation of AES-CBC mode for optimizing memory encryption/decryption (e.g. embedded memory encryption/decryption, flash memory encryption/decryption, etc.).

For example, security is of ever growing importance in mobile space and operating systems, such as Windows®, Android™, and Apple® iOS, which use AES-CBC mode encryption while writing to the memory and consequently performs decryption while reading the data back (e.g. as part of the Bitlocker® application, etc.). With memory becoming faster, such as for UFS (e.g. up to 1.2 GBps bandwidth), AES encryption/decryption throughput is a key performance bottleneck, without an asymmetric implementation of AES channels for decryption.

In the context of the present description, asymmetric AES channels refers to an implementation of AES channels where the number of channels used for AES encryption is necessarily not the same as the number of channels used for decryption. For example, in one embodiment, an asymmetric implementation of AES channels may refer to utilizing one AES channel for encryption and three AES channels in parallel for decryption, etc.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
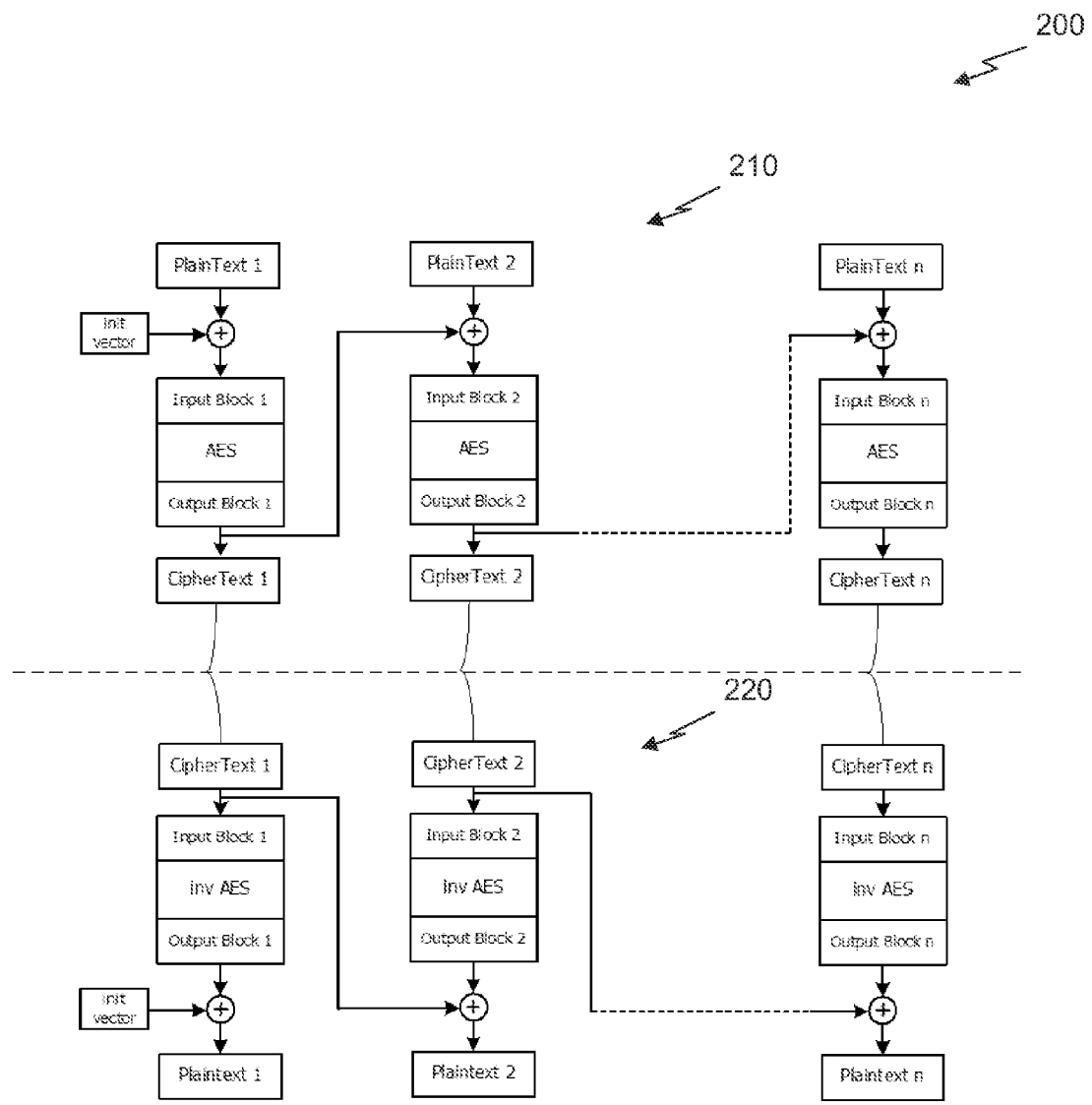
FIG. 2 illustrates an exemplary system flow diagram for AES-CBC encryption and decryption, in accordance with one embodiment.

FIG. 2 illustrates an exemplary system flow diagram 200 for AES encryption 210 and decryption 220, in accordance with one embodiment. As an option, the system flow diagram 200 may be implemented in the context of the previous Figures and/or any subsequent Figure(s). Of course, however, the system flow diagram 200 may be implemented in any desired environment. It should also be noted that the aforementioned definitions may apply during the present description.

As shown in FIG. 2, AES-CBC mode of encryption/decryption utilizes a feedback path during encryption, wherein results of iteration "n" feed into iteration "n+1". However, the decryption does not have any such feedback. Thus, the core engine executing the iteration "n" may be parallelized with "n+1" to increase the throughput and thus meet higher bandwidth requirements.

Traditionally, the encryption and decryption has been symmetric in nature because traditional implementations only use the same core engine to execute encryption and decryption (inverse encryption). Due to this symmetric nature, even though NAND read operations (requiring decryption while reading from memory) are higher performance as compared to NAND write operation (requiring encryption while writing to the memory), traditional AES-CBC implementations have limited peak performance.

Considering the limitation of the feedback path that exists in traditional symmetric AES-CBC mode, in one embodiment, an asymmetric AES-CBC mode of operation may be implemented, which relies on the fact that NAND read operations (which require decryption while reading from memory) are generally higher performance as compared to NAND write operations (which require encryption while writing to the memory), coupled with the fact that the limiting feedback path does not exist for the decryption case.

In the asymmetric AES-CBC mode of operation, the core engine may utilize a decryption path that is a parallelized multi-channel path for increased decryption performance, along with the channel used for encryption (e.g. a subset of the decryption circuit, etc.) that is a single channel. This fits naturally in the performance requirements for NAND read/write operations.

As shown in FIG. 2, input data (e.g. plain text, etc.) is encrypted utilizing an AES encryption module of one of the AES channels 210. As noted, the AES-CBC mode of encryption utilizes a feedback path during encryption, where results of iteration "n" feed into iteration "n+1". Accordingly, the encrypted output data from the first AES-CBC channel ("Output Block 1") would feed into the second AES channel for encryption of additional data (e.g. "Plain Text 2"). Further, the encrypted output data from the second AES channel ("Output Block 2") would feed into another AES channel (e.g. channel three, channel N, etc.) for encryption of additional data (e.g. "Plain Text N", etc.).

For decryption, however (e.g. as indicated by the AES channels 220, etc.), no feedback is present. Accordingly, the core engine decrypting data from iteration "n" (e.g. the first encrypted data, "Cipher Text 1", etc.) may be parallelized with the iteration "n+1" to increase the throughput and thus meet higher bandwidth requirements.

Figure 3:
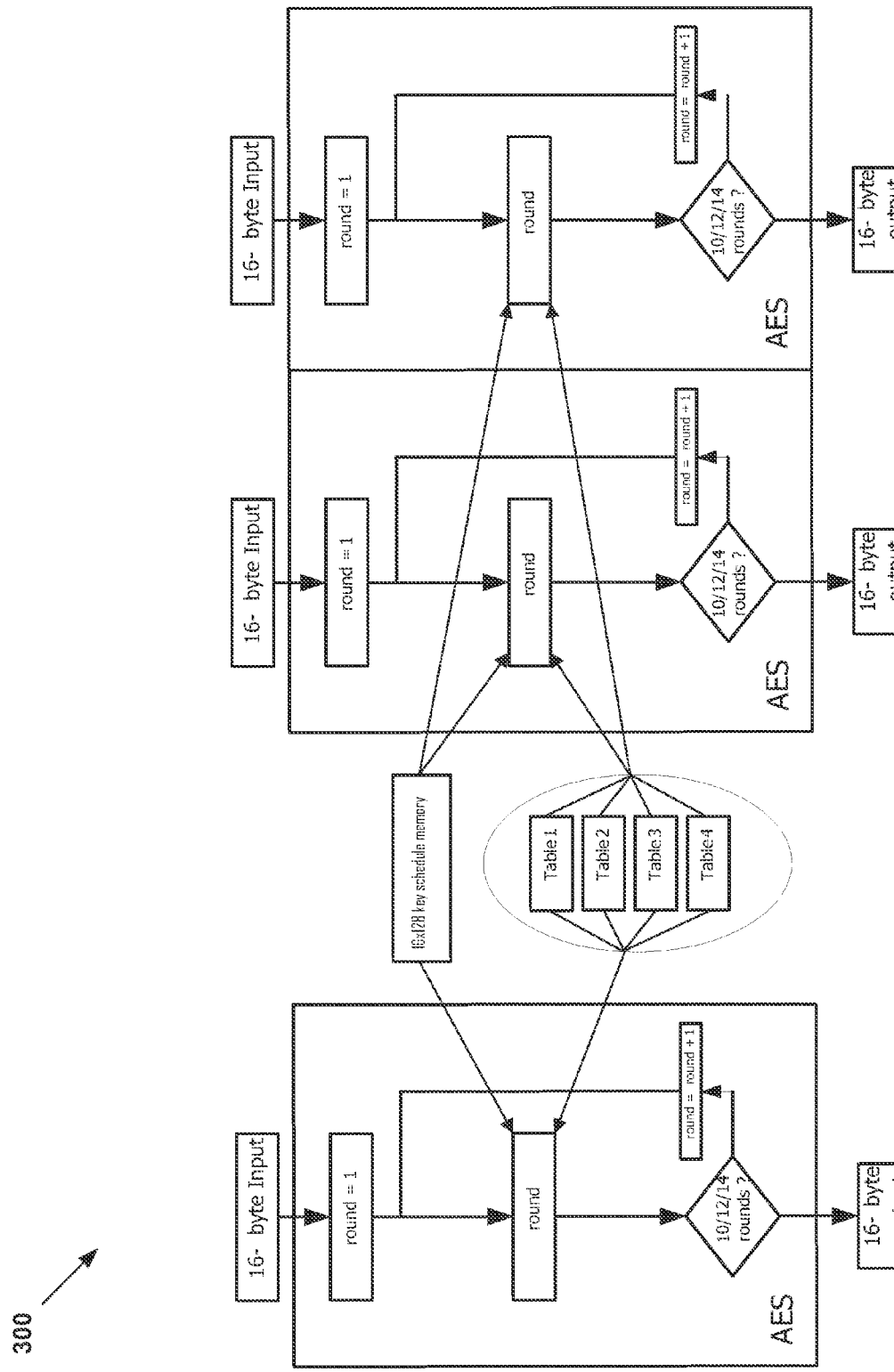
FIG. 3 illustrates a system flow diagram for implementing parallelized AES-CBC channels, in accordance with another embodiment.

FIG. 3 illustrates a system flow diagram 300 for parallelized AES channels, in accordance with another embodiment. As an option, the system flow diagram 300 may be implemented in the context of the previous Figures and/or any subsequent Figure(s). Of course, however, the system flow diagram 300 may be implemented in any desired environment. It should also be noted that the aforementioned definitions may apply during the present description.

Utilizing an asymmetric AES-CBC mode of operation, encryption may be achieved using a single channel. Further, decryption may be achieved utilizing one or any of the channels in order to achieve the required performance target.

As shown in the example of FIG. 3, the performance requirement of decryption is at most three times of the encryption requirement. It should be noted, the architecture is scalable to any proportion to meet the decryption performance targets.

As further shown in the example of FIG. 3, each of the three channels may decrypt a 16-byte input in parallel, the number of processing rounds being 10, 12, or 14, depending on whether a 128 bit, 192, bit or 256 bit encryption key is utilized. For example, given the three channels illustrated in FIG. 3, utilizing a 128 bit key will allow for three decrypted outputs in 10 rounds for a given time stamp.

Of course, in various embodiments, any number of decryption channels may be utilized. Further, utilizing this technique, the decryption bandwidth is decoupled from the encryption bandwidth. Traditional implementations with symmetric CBC mode were tedious to implement, because such implementations relied on bumping up the clock frequency to get the peak throughput.

At a high level, AES encryption includes a Key Expansion step, an Initial Round Step, a Rounds step, and a Final Rounds step. The Key Expansion step includes a process where round keys are derived from the cipher key using Rijndael's key schedule. AES requires a separate 128-bit round key block for each round, plus one more. The Initial Round step includes an AddRoundKey operation, where each byte of the state is combined with a block of the round key using bitwise XOR operation.

The Rounds step includes a SubBytes operation, a ShiftRows operation, a MixColumns operation, and another AddRoundKey operation. The SubBytes operation includes a non-linear substitution step where each byte is replaced with another according to a lookup table. The ShiftRows operation includes a transposition step where each row of the state is shifted cyclically a certain number of steps. The MixColumns operation includes a mixing operation that operates on the columns of the state, combining the four bytes in each column. The Final Round step includes another SubBytes operation, a ShiftRows operation, and an AddRoundKey operation.

AES encryption/decryption bandwidth has been one of the main bottlenecks affecting the overall memory read/write performance. The asymmetric AES-CBC mode of operation allows systems to easily meet the memory read performance targets. For example, memory read performance targets for UFS of 1.2 GBps may easily be met, which would have been otherwise limited by the encryption/decryption coupling in a symmetric AES-CBC implementation (e.g. which is around 600 MBps). Thus, for the UFS example, there is a boost of +600 MBs read performance with the asymmetric AES-CBC scheme while maintaining the feedback on the write path.

It should be noted that the asymmetric AES-CBC approach may be used for meeting requirements for any generic client using CBC mode that has a higher decryption requirement in comparison to encryption requirement.

Figure 4:
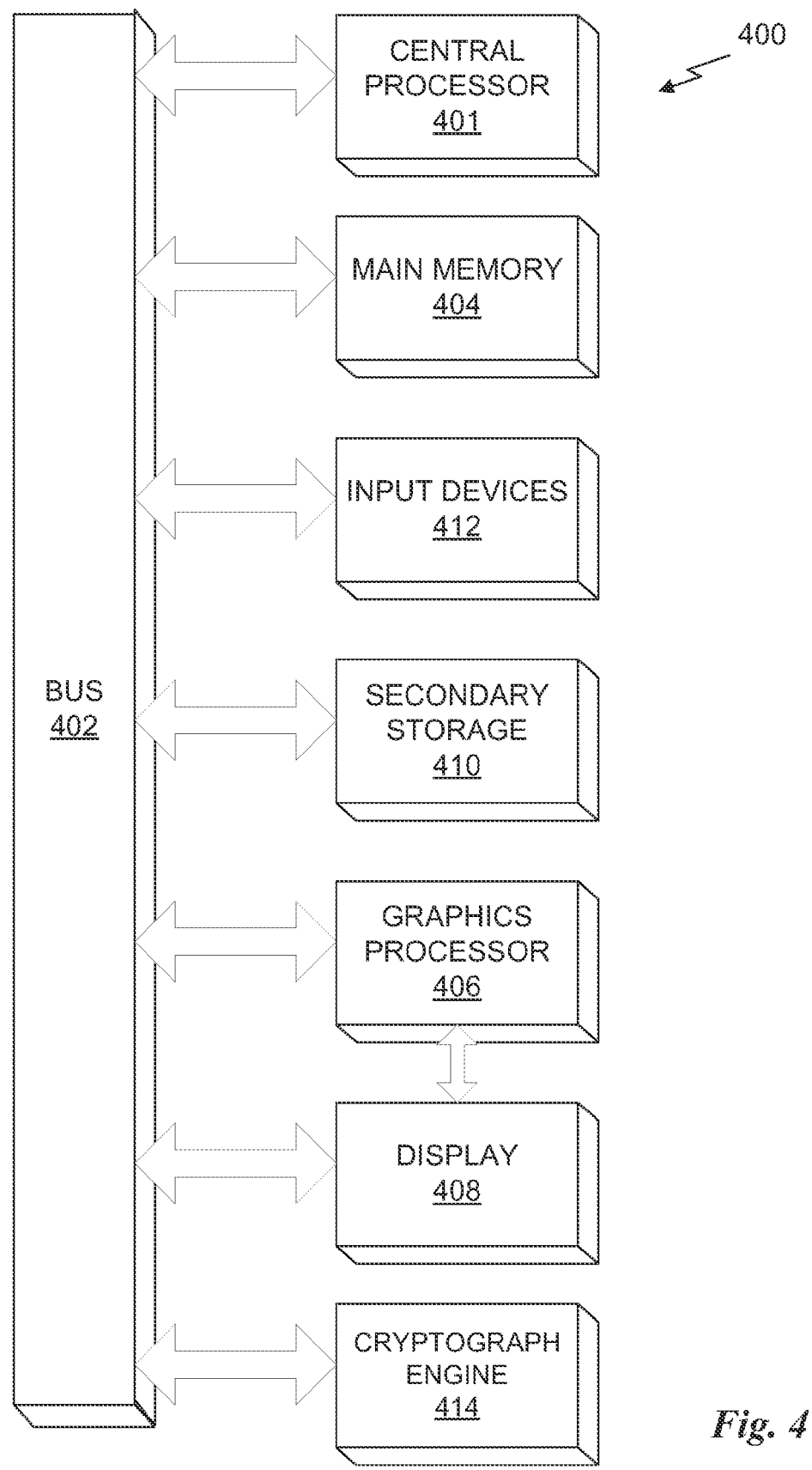
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one central processor 401 that is connected to a communication bus 402. The communication bus 402 may be implemented using any suitable protocol, such as PCI (Peripheral Component Interconnect), PCI-Express, AGP (Accelerated Graphics Port), HyperTransport, or any other bus or point-to-point communication protocol(s). The system 400 also includes a main memory 404. Control logic (software) and data are stored in the main memory 404 which may take the form of random access memory (RAM).

The system 400 also includes input devices 412, a graphics processor 406, and a display 408, i.e. a conventional CRT (cathode ray tube), LCD (liquid crystal display), LED (light emitting diode), plasma display or the like. User input may be received from the input devices 412, e.g., keyboard, mouse, touchpad, microphone, and the like. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 404 and/or the secondary storage 410. Such computer programs, when executed, enable the system 400 to perform various functions. For example, a compiler program that is configured to examiner a shader program and enable or disable attribute buffer combining may be stored in the main memory 404. The compiler program may be executed by the central processor 401 or the graphics processor 406. The main memory 404, the storage 410, and/or any other storage are possible examples of computer-readable media.

The system 400 may further include a cryptograph engine 414. In various embodiments, the cryptograph engine 414 may function to implement cryptography associated encryption standards (e.g. such as AES, RSA, OpenPGP, CipherSaber, etc.), hash standards (e.g. such as SHA-1, SHA-2, HMAC, PBKDF2, etc.) digital signature standards, and public-key infrastructure (PKI) standards, etc. In various embodiments, the cryptograph engine 414 may function as a Cryptographic Hardware Accelerator.

In this case, in various embodiments, the Cryptographic Hardware Accelerator may be an ISA extension (e.g. AES instruction set, etc.), integrated into the SoC as a separate processor (e.g. as a special purpose CPU [i.e. core]), integrated in a coprocessor on the circuit board, or contained on a chip on an extension circuit board (e.g. which may be connected to the mainboard via a BUS, such as PCI, etc.). In one embodiment, the Cryptographic Hardware Accelerator may be utilized to offload the computing of intensive tasks such as encryption/decryption and compression/decompression.

In one embodiment, the architecture and/or functionality of the various previous figures may be implemented in the context of the central processor 401, the graphics processor 406, an integrated circuit (not shown) that is capable of at least a portion of the capabilities of both the central processor 401 and the graphics processor 406, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, server, workstation, game consoles, embedded system, and/or any other type of logic. Still yet, the system 400 may take the form of various other devices including, but not limited to a personal digital assistant (PDA) device, a mobile phone device, a television, etc.

Further, while not shown, the system 400 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a hardware processor of a system, data to be written to hardware memory of the system;
   encrypting, by the hardware processor, the data utilizing a first number of a plurality of AES-CBC channels of the system, to form encrypted data;
   storing, by the hardware processor, the encrypted data in the hardware memory;
   determining, by the hardware processor of the system, that the encrypted data is to be read from the hardware memory;
   determining, by the hardware processor, a second number of the plurality of AES-CBC channels of the system to utilize to decrypt the encrypted data, wherein the second number is different than the first number and achieves a determined performance target;
   while reading the encrypted data from the hardware memory, decrypting the encrypted data utilizing the determined second number of the plurality of AES-CBC channels to achieve the determined performance target;
   wherein the performance target is a speed for the decrypting that is determined as a function of a speed of the encrypting, such that the second number of the plurality of AES-CBC channels of the system to utilize to decrypt the encrypted data is determined as that which achieves the determined speed for the decrypting;
   wherein the speed determined for the decrypting is determined by multiplying a predefined integer by the speed of the encrypting, the predefined integer being greater than one.

2. The method of claim 1, wherein utilizing the determined second number of the plurality of AES-CBC channels to decrypt the encrypted data to achieve the performance target includes using the determined second number of the AES channels in parallel to decrypt the encrypted data.

3. The method of claim 1, wherein the second number of the plurality of AES-CBC channels to utilize to decrypt the encrypted data is determined at runtime.

4. The method of claim 1, wherein determining the second number of the plurality of AES-CBC channels to utilize to decrypt the encrypted data is determined prior to runtime.

5. The method of claim 1, wherein decrypting the encrypted data utilizing the determined second number of the plurality of AES-CBC to achieve the performance target includes utilizing all of the plurality of AES-CBC channels to decrypt the encrypted data.

6. The method of claim 1, wherein decrypting the encrypted data utilizing the determined second number of the plurality of AES-CBC channels to achieve the performance target includes utilizing a portion of the plurality of AES-CBC channels to decrypt the encrypted data.

7. The method of claim 1, wherein the hardware memory is embedded memory or external memory.

8. The method of claim 1, wherein the speed determined for the decrypting is greater than the speed of the encrypting.

9. The method of claim 1, wherein the second number of the plurality of AES-CBC channels of the system to utilize to decrypt the encrypted data scales directly with the predefined integer.

10. A non-transitory computer-readable storage medium storing instructions that, when executed by a processor, cause the processor to perform steps comprising:
    identifying, by a hardware processor of a system, data to be written to hardware memory of the system;
    encrypting, by the hardware processor, the data utilizing a first number of a plurality of AES-CBC channels of the system, to form encrypted data;
    storing, by the hardware processor, the encrypted data in the hardware memory;
    determining, by the hardware processor of the system, that the encrypted data is to be read from the hardware memory;
    determining, by the hardware processor, a second number of the plurality of AES-CBC channels of the system to utilize to decrypt the encrypted data, wherein the second number is different than the first number and achieves a determined performance target;
    while reading the encrypted data from the hardware memory, decrypting the encrypted data utilizing the determined second number of the plurality of AES-CBC channels to achieve the determined performance target;
    wherein the performance target is a speed for the decrypting that is determined as a function of a speed of the encrypting, such that the second number of the plurality of AES-CBC channels of the system to utilize to decrypt the encrypted data is determined as that which achieves the determined speed for the decrypting;
    wherein the speed determined for the decrypting is determined by multiplying a predefined integer by the speed of the encrypting, the predefined integer being greater than one.

11. A system comprising:
    a hardware memory; and
    one or more hardware processing cores coupled to the hardware memory and that are each configured for:
      identifying data to be written to the hardware memory;
      encrypting the data utilizing a first number of a plurality of AES-CBC channels of the one or more processing cores, to form encrypted data;
      storing the encrypted data in the hardware memory;
      determining that the encrypted data is to be read from the hardware memory;
      determining a second number of the plurality of AES-CBC channels of the one or more processing cores to utilize to decrypt the encrypted data, wherein the second number is different than the first number and achieves a determined performance target;
      while reading the encrypted data from the hardware memory, decrypting the encrypted data utilizing the determined second number of the plurality of AES-CBC channels to achieve the determined performance target;
      wherein the performance target is a speed for the decrypting that is determined as a function of a speed of the encrypting, such that the second number of the plurality of AES-CBC channels of the system to utilize to decrypt the encrypted data is determined as that which achieves the determined speed for the decrypting;

wherein the speed determined for the decrypting is determined by multiplying a predefined integer by the speed of the encrypting, the predefined integer being greater than one.

* * * * *